US012392685B2

(12) United States Patent
Tamaki

(10) Patent No.: US 12,392,685 B2
(45) Date of Patent: Aug. 19, 2025

(54) ROTATIONAL TORQUE INSPECTION METHOD FOR BEARING DEVICE FOR VEHICLE WHEEL, AND ROTATIONAL TORQUE INSPECTION DEVICE FOR BEARING DEVICE FOR VEHICLE WHEEL

(71) Applicant: NTN Corporation, Osaka (JP)

(72) Inventor: Shun Tamaki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 371 days.

(21) Appl. No.: 18/018,126

(22) PCT Filed: Aug. 18, 2021

(86) PCT No.: PCT/JP2021/030254
§ 371 (c)(1),
(2) Date: Jan. 26, 2023

(87) PCT Pub. No.: WO2022/039204
PCT Pub. Date: Feb. 24, 2022

(65) Prior Publication Data
US 2023/0266199 A1    Aug. 24, 2023

(30) Foreign Application Priority Data

Aug. 19, 2020  (JP) ................. 2020-138871

(51) Int. Cl.
*G01M 13/04* (2019.01)
*B23P 19/02* (2006.01)
*F16C 19/18* (2006.01)
(52) U.S. Cl.
CPC ............ *G01M 13/04* (2013.01); *B23P 19/02* (2013.01); *F16C 19/18* (2013.01); *F16C 2326/02* (2013.01)

(58) Field of Classification Search
CPC ......... G01M 13/04; B23P 19/02; F16C 19/18; F16C 2326/02
See application file for complete search history.

(56) References Cited

U.S. PATENT DOCUMENTS 6,491,440 B1 * 12/2002 Sahashi .................. B60B 27/00
                                                                384/544
2022/0136562 A1 * 5/2022 Takubo .................. F16C 43/04
                                                                29/894

FOREIGN PATENT DOCUMENTS

EP    3 936 847    1/2022
JP    10-185717    7/1998
(Continued)

OTHER PUBLICATIONS

International Search Report issued Nov. 2, 2021, in International (PCT) Application No. PCT/JP2021/030254, with English translation.

*Primary Examiner* — Kristina M Deherrera
*Assistant Examiner* — Jean F Morello
(74) *Attorney, Agent, or Firm* — Wenderoth, Lind & Ponack, L.L.P.

(57) ABSTRACT

Provided is a rotational torque inspection method for a bearing device for vehicle wheel that enables detection of an abnormality in a component or step occurring midway in the manufacturing of the wheel bearing device. This rotational torque inspection method for a wheel bearing device 1 comprises: a press-fitting step S02; a post-press-fitting rotational torque measurement step S04 for measuring a rotational torque T1 of the wheel bearing device 1 when, after the press-fitting step S02, the hub ring 3 and the inner ring 4 that are inner members and an outer ring 2 that is an outer member are rotated in a relative manner; and a post-press-fitting rotational torque determination step S05 for determining the fitness of the rotational torque T1 by whether or (Continued)

not the rotational torque T1 measured in the post-press-fitting rotational torque measurement step S04 is within a range of standard values S1.

12 Claims, 12 Drawing Sheets

(56) References Cited

FOREIGN PATENT DOCUMENTS

| | | |
|---|---|---|
| JP | 11-44319 | 2/1999 |
| JP | 2000-009562 | 1/2000 |
| JP | 2000-275122 | 10/2000 |
| JP | 2013-198949 | 10/2013 |
| JP | 2019-116917 | 7/2019 |
| JP | 2020-098163 | 6/2020 |

* cited by examiner

ROTATIONAL TORQUE INSPECTION METHOD FOR BEARING DEVICE FOR VEHICLE WHEEL, AND ROTATIONAL TORQUE INSPECTION DEVICE FOR BEARING DEVICE FOR VEHICLE WHEEL

TECHNICAL FIELD

The present invention relates to a rotational torque inspection method for a bearing device for a vehicle wheel and a rotational torque inspection device for a bearing device for a vehicle wheel.

BACKGROUND ART

Conventionally, a bearing device for a vehicle wheel that rotatably supports a wheel in a suspension device of an automobile or the like is known. In such a bearing device for a vehicle wheel, a preload is applied between a rolling body and a raceway ring constituting the bearing device.

As a preload is applied to the bearing device, rigidity of the bearing device can be increased, and vibration and noise can be suppressed. However, if a preload is excessively applied, it may cause an increase in the rotational torque and a decrease in the life. Therefore, it is preferable to check whether an appropriate preload is applied to the bearing device. In particular, in recent years, since reduction in fuel consumption has progressed in automobiles and the like to which a bearing device is attached, there is an increasing demand for managing rotational torque related to a preload of the bearing device.

As a method of checking a preload applied to the bearing device, for example, as disclosed in Patent Literature 1, a preload measurement method, in which a preload gap in an axial direction in a rolling bearing provided with rolling bodies in a plurality of rows is measured to measure a preload applied to the bearing, is known.

CITATIONS LIST

Patent Literature

Patent Literature 1: JP-A 10-185717 Gazette

SUMMARY OF INVENTION

Technical Problems

In a preload measurement method disclosed in Patent Literature 1, it is possible to measure a preload applied to a bearing. However, since appropriateness or inappropriateness of a preload is determined in a completed product state of the bearing, in a case where an abnormality occurs in assembly or the like of the bearing during a manufacturing process of the bearing, it is difficult to verify which component or which step caused the abnormality. Further, in a case where an abnormality is found in the bearing in a completed product state, it has been necessary to discard components other than a component in which the abnormality occurs, which is wasteful.

In view of the above, an object of the present invention is to provide a rotational torque inspection method for a bearing device for a vehicle wheel and a rotational torque inspection device for a bearing device for a vehicle wheel capable of easily detecting an abnormality in a component or a step generated during manufacture of a bearing device for a vehicle wheel and reducing the number of discarded components.

Solutions to Problems

That is, a rotational torque inspection method for a bearing device for a vehicle wheel including an outer member having a plurality of rows of outer raceway surfaces on an inner periphery, an inner member including a hub ring having a small-diameter step portion extending in an axial direction on an outer periphery and an inner ring press-fitted into the small-diameter step portion of the hub ring, the inner member having a plurality of rows of inner raceway surfaces facing a plurality of rows of the outer raceway surfaces, and a plurality of rows of rolling bodies rollably accommodated between both raceway surfaces of the outer member and the inner member. The rotational torque inspection method includes a press-fitting step of press-fitting the inner ring into the small-diameter step portion of the hub ring to a position where the inner ring abuts on the hub ring in the axial direction, a post-press-fitting rotational torque measurement step of measuring post-press-fitting rotational torque of the bearing device for a vehicle wheel when the inner member and the outer member are relatively rotated after the press-fitting step, and a post-press-fitting rotational torque determination step of determining appropriateness or inappropriateness of the post-press-fitting rotational torque depending on whether or not the post-press-fitting rotational torque measured in the post-press-fitting rotational torque measurement step falls within a range of a reference value.

Further, a rotational torque inspection method for a bearing device for a vehicle wheel is a rotational torque inspection method for a bearing device for a vehicle wheel including an outer member having a plurality of rows of outer raceway surfaces on an inner periphery, an inner member including a hub ring having a small-diameter step portion extending in an axial direction on an outer periphery and an inner ring press-fitted into the small-diameter step portion of the hub ring, the inner member having a plurality of rows of inner raceway surfaces facing a plurality of rows of the outer raceway surfaces, and a plurality of rows of rolling bodies rollably accommodated between both raceway surfaces of the outer member and the inner member. The rotational torque inspection method includes a crimping step of crimping an inner-side end portion of the small-diameter step portion into which the inner ring is press-fitted, a post-crimping rotational torque measurement step of measuring post-crimping rotational torque of the bearing device for a vehicle wheel when the inner member and the outer member are relatively rotated after the crimping step, and a post-crimping rotational torque determination step of determining appropriateness or inappropriateness of the post-crimping rotational torque depending on whether or not the post-crimping rotational torque measured in the post-crimping rotational torque measurement step falls within a range of a reference value.

Further, a rotational torque inspection device for a bearing device for a vehicle wheel is a rotational torque inspection device for a bearing device for a vehicle wheel including an outer member having a plurality of rows of outer raceway surfaces on an inner periphery, an inner member including a hub ring having a small-diameter step portion extending in an axial direction on an outer periphery and an inner ring press-fitted into the small-diameter step portion of the hub ring, the inner member having a plurality of rows of inner raceway surfaces facing a plurality of rows of the outer raceway surfaces, and a plurality of rows of rolling bodies rollably accommodated between both raceway surfaces of the outer member and the inner member. The rotational torque inspection device is capable of performing a press-fitting step of press-fitting the inner ring into the small-diameter step portion of the hub ring to a position where the inner ring abuts on the hub ring in the axial direction, a post-press-fitting rotational torque measurement step of measuring post-press-fitting rotational torque of the bearing device for a vehicle wheel when the inner member and the outer member are relatively rotated after the press-fitting step, and a post-press-fitting rotational torque determination step of determining appropriateness or inappropriateness of the post-press-fitting rotational torque depending on whether or not the post-press-fitting rotational torque measured in the post-press-fitting rotational torque measurement step falls within a range of a reference value.

A rotational torque inspection device for a bearing device for a wheel is a rotational torque inspection device for a bearing device for a vehicle wheel including an outer member having a plurality of rows of outer raceway surfaces on an inner periphery, an inner member including a hub ring having a small-diameter step portion extending in an axial direction on an outer periphery and an inner ring press-fitted into the small-diameter step portion of the hub ring, the inner member having a plurality of rows of inner raceway surfaces facing a plurality of rows of the outer raceway surfaces, and a plurality of rows of rolling bodies rollably accommodated between both raceway surfaces of the outer member and the inner member. The rotational torque inspection device is capable of performing a crimping step of crimping an inner-side end portion of the small-diameter step portion into which the inner ring is press-fitted, a post-crimping rotational torque measurement step of measuring post-crimping rotational torque of the bearing device for a vehicle wheel when the inner member and the outer member are relatively rotated after the crimping step, and a post-crimping rotational torque determination step of determining appropriateness or inappropriateness of the post-crimping rotational torque depending on whether or not the post-crimping rotational torque measured in the post-crimping rotational torque measurement step falls within a range of a reference value.

Advantageous Effects of Invention

As advantageous effects of the present invention, effects described below are obtained.

That is, according to the present invention, it is possible to easily detect an abnormality of a component or a step that occurs during manufacture of a bearing device for a vehicle wheel, and to reduce the number of discarded components.

DESCRIPTION OF EMBODIMENTS

First Embodiment of Bearing Device for Vehicle Wheel

Hereinafter, a bearing device for a vehicle wheel 1 as a first embodiment of a bearing device for a vehicle wheel for which a rotational torque inspection method according to the present invention is performed will be described with reference to FIG. 1.

Figure 1:
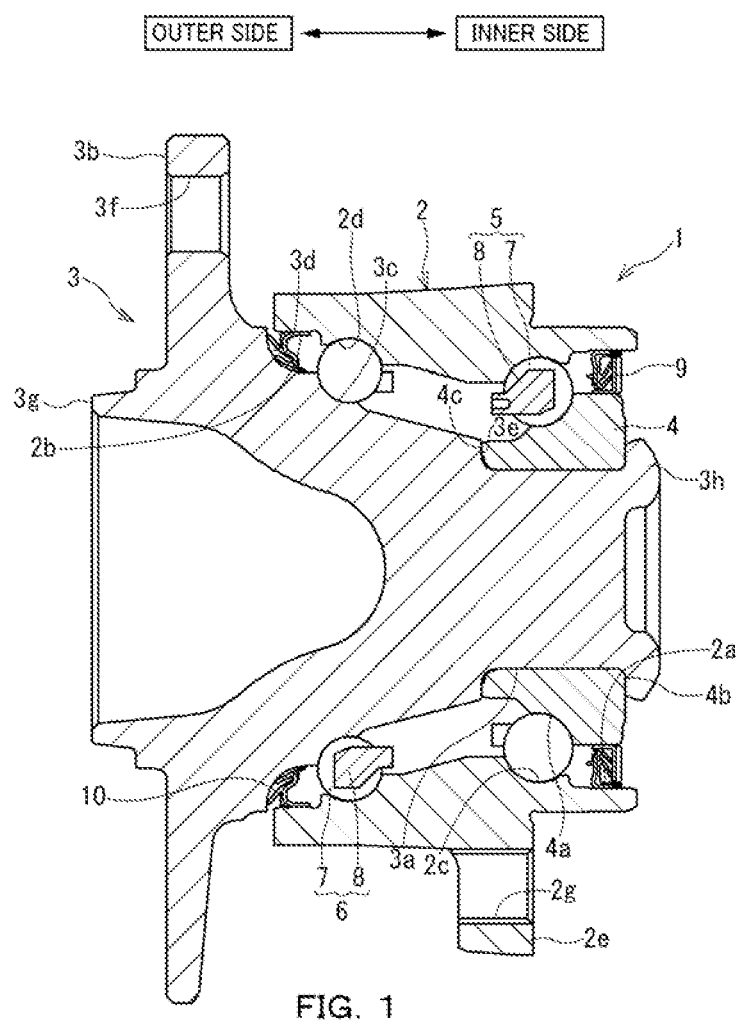
FIG. 1 is a side cross-sectional view illustrating a first embodiment of a bearing device for a vehicle wheel for which a rotational torque inspection method is performed.

The bearing device for a vehicle wheel 1 illustrated in FIG. 1 rotatably supports a driven wheel in a suspension device of a vehicle such as an automobile. The bearing device for a vehicle wheel 1 has a "third generation" configuration, and includes an outer ring 2 that is an outer member, a hub ring 3 and an inner ring 4 that are inner members, two rows of an inner-side ball row 5 and an outer-side ball row 6 that are rolling rows, and an inner-side seal member 9 and an outer-side seal member 10. Here, "inner side" represents the vehicle body side of the bearing device for a vehicle wheel 1 when attached to a vehicle body, and "outer side" represents the wheel side of the bearing device for a vehicle wheel 1 when attached to the vehicle body. Further, the axial direction represents a direction along a rotation axis of the bearing device for a vehicle wheel 1.

An inner-side opening portion 2a to which the inner-side seal member 9 can be fitted is formed in an inner-side end portion of the outer ring 2. An outer-side opening portion 2b to which the outer-side seal member 10 can be fitted is formed in an outer-side end portion of the outer ring 2. An outer raceway surface 2c on the inner side and an outer raceway surface 2d on the outer side are formed on the inner peripheral surface of the outer ring 2. A vehicle body mounting flange 2e for mounting the outer ring 2 on a vehicle body side member is integrally formed on the outer peripheral surface of the outer ring 2. The vehicle body mounting flange 2e is provided with a bolt hole 2g into which a fastening member (here, a bolt) for fastening the vehicle body side member and the outer ring 2 is inserted.

In an inner-side end portion of the hub ring 3, a small-diameter step portion 3a whose diameter is smaller than that of an outer-side end portion is formed on the outer peripheral surface. The small-diameter step portion 3a extends in the axial direction, and a shoulder portion 3e is formed in an outer-side end portion of the small-diameter step portion 3a of the hub ring 3. A vehicle wheel mounting flange 3b for mounting a wheel is integrally formed in an outer-side end portion of the hub ring 3. The vehicle wheel mounting flange 3b is provided with a bolt hole 3f into which a hub bolt for fastening the hub ring 3 and a wheel or a brake component is press-fitted.

The hub ring 3 is provided with an inner raceway surface 3c on the outer side in a manner facing the outer raceway surface 2d on the outer side of the outer ring 2. A lip sliding surface 3d with which the outer-side seal member 10 comes into sliding contact is formed on the base portion side of the vehicle wheel mounting flange 3b of the hub ring 3. The outer-side seal member 10 is fitted to an outer-side opening end of an annular space formed by the outer ring 2 and the hub ring 3. The hub ring 3 has an outer-side end surface 3g in an end portion further on the outer side than the vehicle wheel mounting flange 3b.

The inner ring 4 is provided on the small-diameter step portion 3a of the hub ring 3. The inner ring 4 is fixed to the small-diameter step portion 3a of the hub ring 3 by press-fitting and crimping. The inner ring 4 applies a preload to the inner-side ball row 5 and the outer-side ball row 6 which are rolling rows. The inner ring 4 has an inner-side end surface 4b in an inner-side end portion, and an outer-side end surface 4c in an outer-side end portion. A crimped portion 3h crimped to the inner-side end surface 4b of the inner ring 4 is formed in an inner-side end portion of the hub ring 3.

On the inner side of the hub ring 3, an inner raceway surface 4a is formed on an outer peripheral surface of the inner ring 4. The inner raceway surface 4a faces the outer raceway surface 2c on the inner side of the outer ring 2.

The inner-side ball row 5 and the outer-side ball row 6, which are rolling rows, are configured in a manner that a plurality of balls 7, which are rolling bodies, are held by a cage 8. The inner-side ball row 5 is rollably sandwiched between the inner raceway surface 4a of the inner ring 4 and the outer raceway surface 2c on the inner side of the outer ring 2. The outer-side ball row 6 is rollably sandwiched between the inner raceway surface 3c of the hub ring 3 and the outer raceway surface 2d on the outer side of the outer ring 2.

In the bearing device for a vehicle wheel 1, the outer ring 2, the hub ring 3 and the inner ring 4, the inner-side ball row 5, and the outer-side ball row 6 constitute a double row angular contact ball bearing. Note that the bearing device for a vehicle wheel 1 may be configured by a double row tapered roller bearing.

First Embodiment of Rotational Torque Inspection Method

Figure 2:
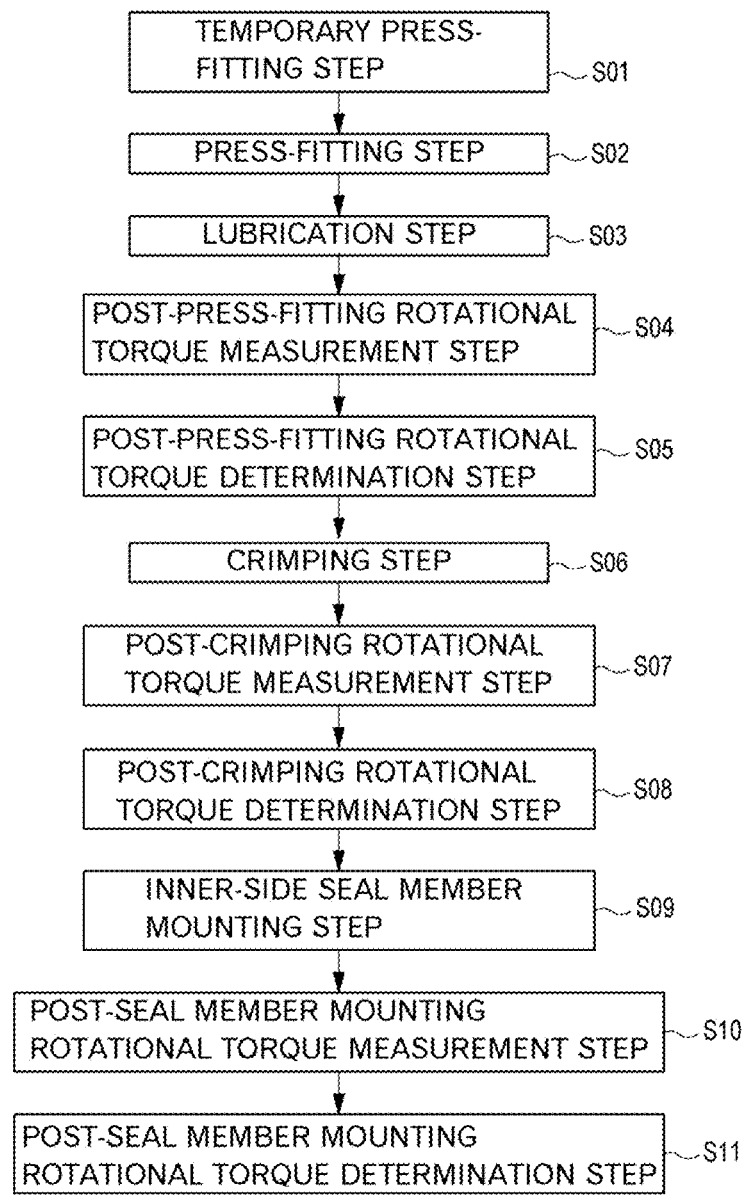
FIG. 2 is a diagram illustrating a process of a rotational torque inspection method according to the first embodiment.

Next, a rotational torque inspection method of the bearing device for a vehicle wheel 1 according to the first embodiment of the rotational torque inspection method of the present invention will be described. As illustrated in FIG. 2, the rotational torque inspection method in the present embodiment is mainly performed during assembly of the bearing device for a vehicle wheel 1. Specifically, the rotational torque inspection method includes a temporary press-fitting step (S01), a press-fitting step (S02), a lubrication step (S03), a post-press-fitting rotational torque measurement step (S04), a post-press-fitting rotational torque determination step (S05), a crimping step (S06), a post-crimping rotational torque measurement step (S07), a post-crimping rotational torque determination step (S08), an inner-side seal member mounting step (S09), a post-seal member mounting rotational torque measurement step (S10), and a post-seal member mounting rotational torque determination step (S11). Each step of the rotational torque inspection method will be described below.

(Temporary Press-Fitting Step)

Figure 3:
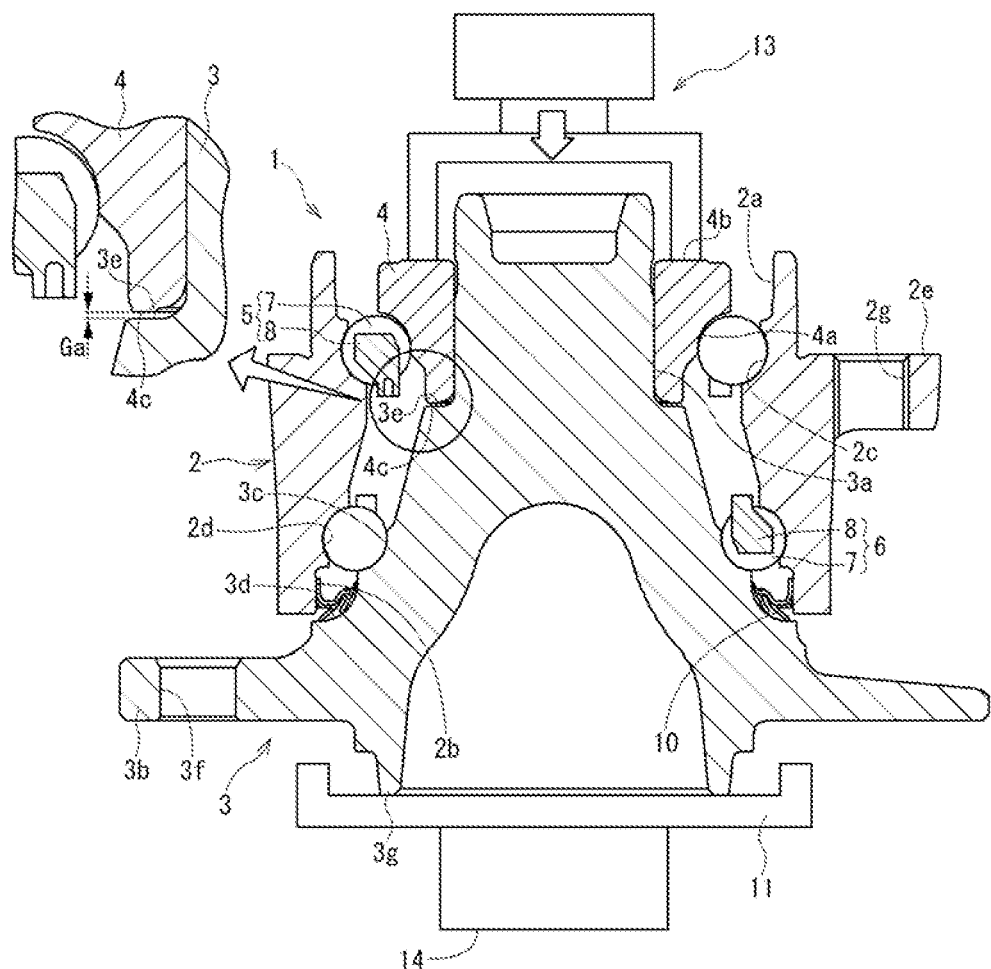
FIG. 3 is a side cross-sectional view illustrating the bearing device for a vehicle wheel according to the first embodiment in a state where an inner ring is temporarily press-fitted into a small-diameter step portion of a hub ring.

As illustrated in FIG. 3, the hub ring 3 is placed on a support base 11 in a posture in which the axial direction is the vertical direction and the outer-side end surface 3g is positioned downward. The outer-side end surface 3g of the hub ring 3 is grounded to the support base 11. The outer ring 2 is rotatably mounted on the hub ring 3 placed on the support base 11 via the inner-side ball row 5 and the outer-side ball row 6. The outer-side seal member 10 is fitted to an outer-side end portion of the outer ring 2. A space between the hub ring 3 and the outer ring 2 is filled with grease.

In the temporary press-fitting step (S01), first, the inner ring 4 is temporarily press-fitted into the small-diameter step portion 3a of the hub ring 3 placed on the support base 11. The temporary press-fitting of the inner ring 4 is performed by press-fitting the inner ring 4 into the small-diameter step portion 3a from above and stopping the press-fitting before the outer-side end surface 4c of the inner ring 4 abuts on the shoulder portion 3e of the hub ring 3. Here, the press-fitting work of the inner ring 4 is performed in a state where a predetermined pressure is applied using a pushing device 13 such as a hydraulic cylinder or an air cylinder, for example. That is, the pushing device 13 is configured such that the inner ring 4 can be press-fitted into the small-diameter step portion 3a, and the temporary press-fitting step (S01) can be performed using the pushing device 13. At a time point at which the temporary press-fitting of the inner ring 4 is completed, an axial positive gap Ga exists between the outer-side end surface 4c of the inner ring 4 and the shoulder portion 3e of the hub ring 3.

(Press-Fitting Step)

Figure 4:
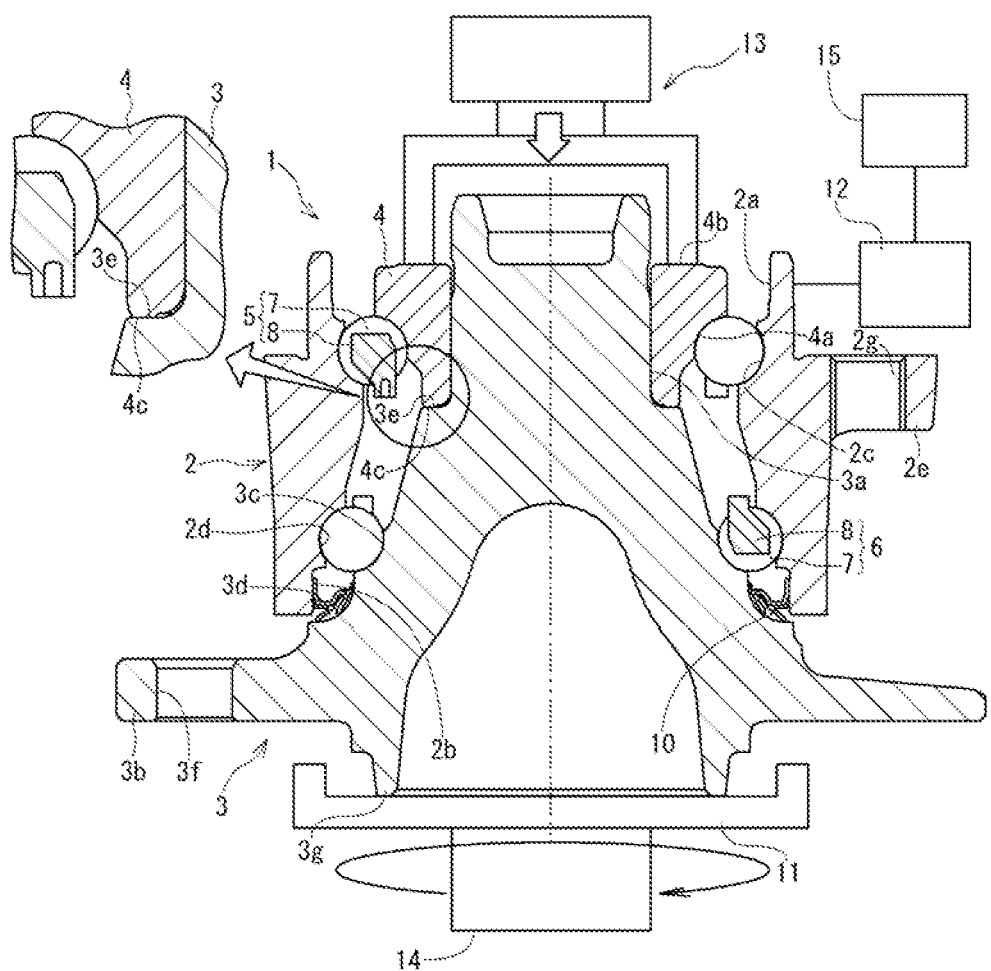
FIG. 4 is a side cross-sectional view illustrating the bearing device for a vehicle wheel according to the first embodiment in a state where the inner ring is press-fitted into the small-diameter step portion of the hub ring.

After the temporary press-fitting step (S01), the press-fitting step (S02) is performed. As illustrated in FIG. 4, in the press-fitting step (S02), the inner ring 4 is press-fitted into the small-diameter step portion 3a to a position where the outer-side end surface 4c of the inner ring 4 abuts on the shoulder portion 3e of the hub ring 3. Here, the press-fitting work of the inner ring 4 is performed in a state where a predetermined pressure is applied using a pushing device 13 such as a hydraulic cylinder or an air cylinder, for example. That is, the press-fitting step (S02) can be performed using the pushing device 13. After the inner ring 4 is press-fitted into the small-diameter step portion 3a in the press-fitting step (S02), axial negative gaps are generated between the inner-side ball row 5, an inner-side outer ring raceway surface 2c, and the inner ring raceway surface 4a, and between the outer-side ball row 6, the outer-side outer ring raceway surface 2d, and the hub ring raceway surface 3c.

(Lubrication Step)

After the press-fitting step (S02), the lubrication step (S03) is performed. In the lubrication step (S03), the hub ring 3 into which the inner ring 4 is press-fitted and the outer ring 2 are relatively rotated, so that the balls 7 of the inner-side ball row 5 and the outer-side ball row 6 are lubricated with the grease with which a space between the hub ring 3 and the outer ring 2 is filled. In the lubrication step (S03), the hub ring 3 may be rotated while the outer ring 2 is fixed, or the outer ring 2 may be rotated while the hub ring 3 is fixed. In the lubrication step (S03), for example, the support base 11 is rotationally driven by a drive source 14 such as a motor, so that the hub ring 3 and the outer ring 2 can be relatively rotated. That is, the drive source 14 can relatively rotate the hub ring 3 and the outer ring 2, and the lubrication step (S03) can be performed by using the drive source 14.

By performing the lubrication step (S03), the resistance generated between the grease and the ball 7 can be made constant when the hub ring 3 and the outer ring 2 are relatively rotated. In this manner, when the rotational torque of the bearing device for a vehicle wheel 1 is measured in the post-press-fitting rotational torque measurement step (S04), the post-crimping rotational torque measurement step (S07), and the post-seal member mounting rotational torque measurement step (S10) that are performed later, it is possible to suppress variations in the measured rotational torque.

From the viewpoint of making the resistance generated between the grease and the ball 7 constant, it is preferable to relatively rotate the hub ring 3 and the outer ring 2 by 30 rotations or more. By relatively rotating the hub ring 3 and the outer ring 2 by 30 rotations or more, it is possible to effectively suppress variations in the measured rotational torque.

(Post-Press-Fitting Rotational Torque Measurement Step)

The post-press-fitting rotational torque measurement step (S04) is performed after the lubrication step (S03). In the post-press-fitting rotational torque measurement step (S04), a torque measuring instrument 12 measures rotational torque T1 when the hub ring 3 with the inner ring 4 press-fitted into the small-diameter step portion 3a and the outer ring 2 are relatively rotated. In the post-press-fitting rotational torque measurement step (S04), for example, the hub ring 3 and the outer ring 2 can be relatively rotated by the drive source 14, and the post-press-fitting rotational torque measurement step (S04) can be performed using the drive source 14 and the torque measuring instrument 12. The rotational torque T1 is an example of post-press-fitting rotational torque and is rotational torque measured after the press-fitting step (S02) and before the crimping step (S06). In the post-press-fitting rotational torque measurement step (S04), the hub ring 3 may be rotated while the outer ring 2 is fixed, or the outer ring 2 may be rotated while the hub ring 3 is fixed.

In a case where the hub ring 3 is rotated, the revolution speed of the balls 7 in the inner-side ball row 5 and the outer-side ball row 6 becomes lower than that in a case where the outer ring 2 is rotated, and the variation in the rotational torque value measured when the rotational speed of the hub ring 3 changes becomes small. Therefore, it is preferable to rotate the hub ring 3 in the rotational torque measurement step. Note that, in a case where the hub ring 3 is rotated, the hub ring 3 can be rotated by rotating the support base 11 on which the hub ring 3 is placed.

Figure 5:
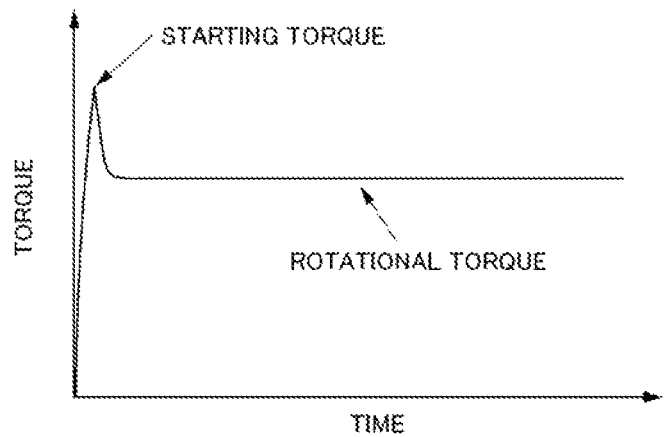
FIG. 5 is a diagram illustrating a relationship between time and torque when the hub ring and an outer ring are relatively rotated.

Further, in the post-press-fitting rotational torque measurement step (S04), not starting torque of the bearing but rotational torque is measured. As illustrated in FIG. 5, starting torque, which is a peak value of initial motion torque when rotation of the bearing is started, decreases with the lapse of time, and has a large temporal change. Therefore, repetitive reproducibility is poor. In contrast, rotational torque is torque after the bearing starts rotating, and shows a constant value with a small temporal change. Therefore, in the post-press-fitting rotational torque measurement step (S04), a torque value of the bearing can be measured with high accuracy by measuring the rotational torque T1.

Figure 6:
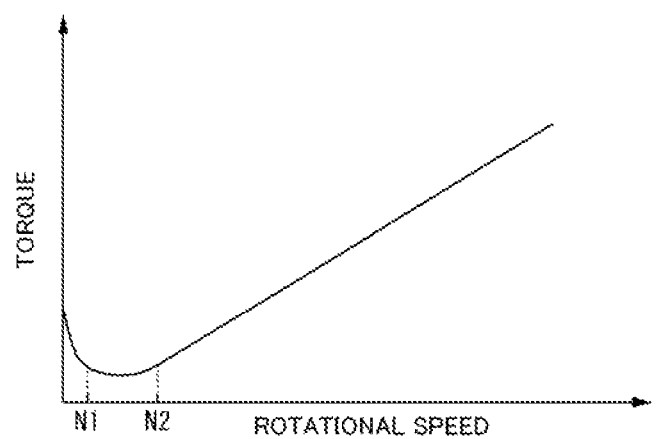
FIG. 6 is a diagram illustrating a relationship between a rotational speed and torque when the hub ring and the outer ring are relatively rotated.

As illustrated in FIG. 6, rotational torque of the bearing when the hub ring 3 and the outer ring 2 are relatively rotated, which increases as a rotational speed increases in a range where a rotational speed of the hub ring 3 or the outer ring 2 is equal to or more than a certain value, decreases as the rotational speed increases when the rotational speed of the hub ring 3 or the outer ring 2 is extremely low, and then turns to increase. That is, there is a region where the rotational torque of the bearing changes from decreasing to increasing as the rotational speed increases, and in the region, degree of fluctuation of the rotational torque with respect to a change in the rotational speed is small.

In the post-press-fitting rotational torque measurement step (S04), the hub ring 3 or the outer ring 2 is rotated at a constant rotational speed so that measured rotational torque does not vary. Further, the rotational speed of the hub ring 3 or the outer ring 2 is set in a range of rotational speeds N1 to N2 in a region where the rotational torque changes from decreasing to increasing. In this manner, even if the rotational speed changes during the measurement of the rotational torque T1, the fluctuation of the rotational torque can be reduced.

In the post-press-fitting rotational torque measurement step (S04), the rotational torque is measured in a state where a dynamic frictional force is generated between the inner members 3 and 4 and the outer member 2. Specifically, the rotational torque is measured in a state where a dynamic frictional force is generated between the inner members 3 and 4 and the rolling body 7, between the hub ring 3 and the outer-side seal member 10, and between the outer ring 2 and the rolling bodies 7 and the outer-side seal member 10. In general, since a coefficient of dynamic friction is smaller than a coefficient of static friction and has a small variation, the rotational torque can be measured with high accuracy.

In the present embodiment, the rotational speed $N_1$, which is a lower limit value of the range of the rotational speed, is set to 10 rotations/min at which the rotational torque can be measured in a state where a dynamic frictional force is generated. The rotational speed $N_2$, which is an upper limit value of the range of the rotational speed, is set to 30 rotations/min, which is the rotational speed at which the stirring resistance of the grease with which a space between the hub ring 3 and the outer ring 2 is filled is as small as possible. In this manner, even if the rotational speed changes during measurement of the rotational torque T1, a fluctuation of the rotational torque T1 can be reduced, and the rotational torque can be stably measured.

In the post-press-fitting rotational torque measurement step (S04), the hub ring 3 or the outer ring 2 is rotated in the range of the small rotational speeds N1 to N2 at which the degree of variation in the rotational torque with respect to a change in the rotational speed is small. Thus, even in a case where the rotational speed of the hub ring 3 or the outer ring 2 changes, the fluctuation in the rotational torque can be minimized and the rotational torque can be measured with high accuracy.

Further, in the post-press-fitting rotational torque measurement step (S04), the rotational torque T1 of the bearing device for a vehicle wheel 1 is measured in a state where the outer-side seal member 10 is fitted to an outer-side opening end of an annular space formed by the outer ring 2 and the hub ring 3. Here, the outer-side seal member 10 is located axially on the opposite side to the small-diameter step portion 3a of the hub ring 3 that is crimped for fixing the inner ring 4. Therefore, even if an abnormality occurs in the inner ring raceway surface 4a or the like in the crimping step (S06) described below, seal torque of the outer-side seal member 10 is hardly affected and the rotational torque of the bearing device for a vehicle wheel 1 is also hardly changed.

(Post-Press-Fitting Rotational Torque Determination Step)

After the post-press-fitting rotational torque measurement step (S04), the post-press-fitting rotational torque determination step (S05) is performed. In the post-press-fitting rotational torque determination step (S05), appropriateness or inappropriateness of the rotational torque T1 is determined depending on whether or not the rotational torque T1 measured in the post-press-fitting rotational torque measurement step (S04) is within a range of a reference value S1. The reference value S1 is an example of a reference value used when appropriateness or inappropriateness of post-press-fitting rotational torque is determined. In the post-press-fitting rotational torque determination step (S05), for example, appropriateness or inappropriateness of the rotational torque T1 can be determined by a determination device 15 connected to the torque measuring instrument 12. That is, the determination device 15 can determine appropriateness or inappropriateness of the rotational torque T1, and the post-press-fitting rotational torque determination step (S05) can be performed by using the determination device 15. In the post-press-fitting rotational torque determination step (S05), when the rotational torque T1 falls within a range of the reference value S1, the rotational torque T1 is determined to be appropriate, and when the rotational torque T1 exceeds the range of the reference value S1, the rotational torque T1 is determined not to be appropriate. The reference value S1 has a lower limit value and an upper limit value in a predetermined range, and can be set in advance.

As described above, by determining appropriateness or inappropriateness of rotational torque of the bearing device for a vehicle wheel 1 by using the rotational torque T1 measured in the post-press-fitting rotational torque measurement step (S04) performed after the press-fitting step (S02) and before the crimping step (S06), it is possible to detect whether or not an abnormality occurs in a component such as the outer-side seal member 10 and a step such as the press-fitting step (S02) during a manufacturing process of the bearing device for a vehicle wheel 1. By the above, as compared with a case where appropriateness or inappropriateness of rotational torque is determined after the bearing device for a vehicle wheel 1 is in a completed state, it is possible to easily detect in which component or in which step an abnormality occurs, and it is possible to reduce the number of discarded components.

Further, rotational torque of the bearing when the hub ring 3 and the outer ring 2 are relatively rotated varies depending on variations in various conditions such as a dimension and hardness of the outer-side seal member 10, a fitting state to the outer ring 2 and the hub ring 3, viscosity and an application amount of grease, and temperature of the bearing device for a vehicle wheel 1 at which rotational torque is measured. Therefore, the reference value S1 can be set in consideration of variations in these conditions.

In particular, in a case where temperature of the bearing device for a vehicle wheel 1 changes, a measured value of rotational torque fluctuates greatly. For this reason, after a measured value of the rotational torque T1 is corrected according to temperature of the bearing device for a vehicle wheel 1, appropriateness or inappropriateness of the rotational torque T1 can be determined. As described above, by correcting a measured value of the rotational torque T1 according to temperature of the bearing device for a vehicle wheel 1 at which the rotational torque T1 is measured, it is possible to determine appropriateness or inappropriateness of the rotational torque T1 with high accuracy.

(Crimping Step)

Figure 7:
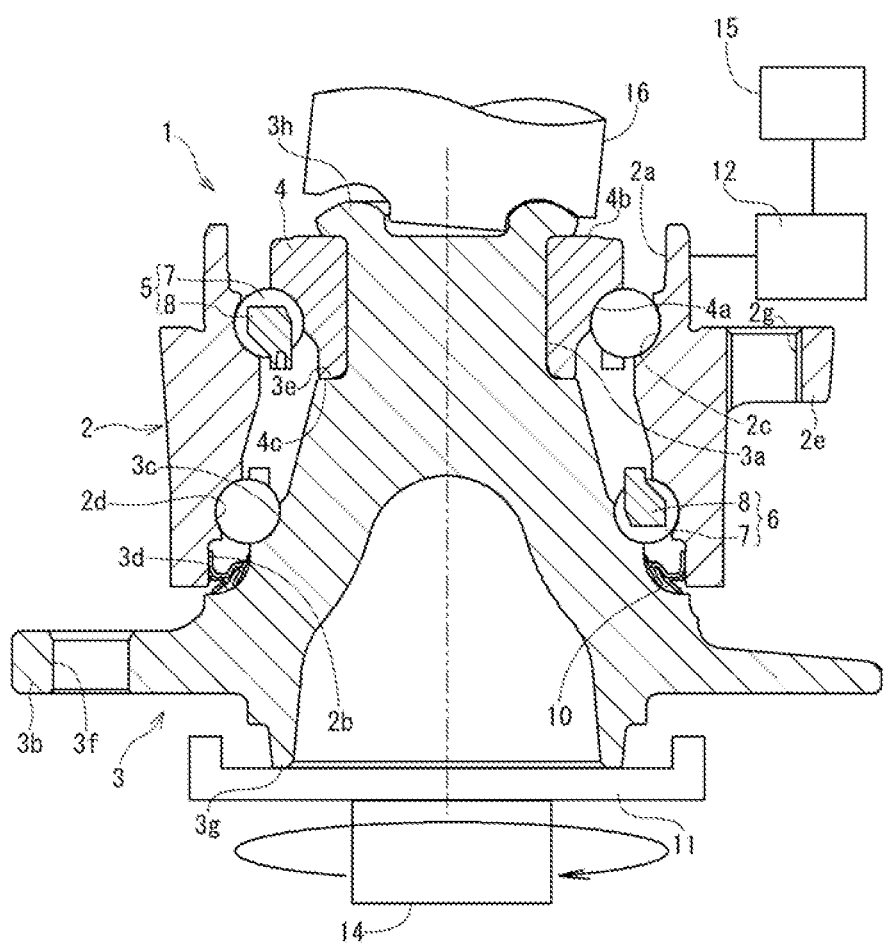
FIG. 7 is a side cross-sectional view illustrating the bearing device for a vehicle wheel according to the first embodiment in a state where the small-diameter step portion of the hub ring is crimped to the inner ring.

The crimping step (S06) is performed after the post-press-fitting rotational torque determination step (S05). In the crimping step (S06), as illustrated in FIG. 7, crimping processing for crimping an inner-side end portion of the small-diameter step portion 3a of the hub ring 3 to the inner-side end surface 4b of the inner ring 4 is performed. The crimping processing can be performed by swinging crimping processing using a crimping tool such as a crimping die 16. That is, the crimping die 16 can crimp an inner-side end portion of the small-diameter step portion 3a to the inner ring 4 in a state where the hub ring 3 is rotated by the drive source 14, and the crimping step (S06) can be performed by using the crimping die 16 and the drive source 14. By performing the crimping step (S06), the crimped portion 3h is formed in an inner-side end portion of the hub ring 3. After the crimping step (S06), an axial negative gap is generated between the inner ring 4 and the hub ring 3.

(Post-Crimping Rotational Torque Measurement Step)

The post-crimping rotational torque measurement step (S07) is performed after the crimping step (S06). In the post-crimping rotational torque measurement step (S07), rotational torque is measured in a state where a dynamic frictional force is generated between the inner members 3 and 4 and the outer member 2, as in the post-press-fitting rotational torque measurement step (S04). In the post-crimping rotational torque measurement step (S07), the torque measuring instrument 12 measures rotational torque T2 when the hub ring 3 in which the small-diameter step portion 3a is crimped to the inner ring 4 and the outer ring 2 are relatively rotated by the drive source 14. As described above, the post-crimping rotational torque measurement step (S07) can be performed using the drive source 14 and the torque measuring instrument 12. The rotational torque T2 is an example of post-crimping rotational torque, and is rotational torque measured after the crimping step (S06) and before the inner-side seal member mounting step (S09). In the post-crimping rotational torque measurement step (S07), the hub ring 3 may be rotated while the outer ring 2 is fixed, or the outer ring 2 may be rotated while the hub ring 3 is fixed.

However, as in the case of the post-press-fitting rotational torque measurement step (S04), it is preferable to rotate the hub ring 3 because variations in a rotational torque value measured when a rotational speed of the hub ring 3 changes are reduced. Further, also in the post-crimping rotational torque measurement step (S07), the rotational torque can be measured with high accuracy as in the case of the post-press-fitting rotational torque measurement step (S04), by measuring the rotational torque instead of the starting torque of the bearing, and measuring the rotational torque T2 while the hub ring 3 or the outer ring 2 is rotated at a constant rotational speed at the low rotational speeds N1 to N2.

In this case, as in the case of the post-press-fitting rotational torque measurement step (S04), the rotational speed N1 can be set to 10 rotations/min and the rotational speed N2 can be set to 30 rotations/min. In this manner, even if the rotational speed changes during measurement of the rotational torque T2, a fluctuation of the rotational torque T2 can be reduced, and the rotational torque can be stably measured.

Further, also in the post-crimping rotational torque measurement step (S07), the rotational torque T2 of the bearing device for a vehicle wheel 1 is measured in a state where the outer-side seal member 10 is fitted to an outer-side opening end of an annular space formed by the outer ring 2 and the hub ring 3. However, the outer-side seal member 10 is located axially on the opposite side to the small-diameter step portion 3a of the hub ring 3 that is crimped for fixing the inner ring 4. Therefore, even if an abnormality occurs in the inner ring raceway surface 4a or the like in the crimping step (S06) performed before the post-crimping rotational torque measurement step (S07), seal torque of the outer-side seal member 10 is hardly affected and the rotational torque of the bearing device for a vehicle wheel 1 is also hardly changed.

Further, between the crimping step (S06) and the post-crimping rotational torque measurement step (S07), a step similar to the lubrication step (S03), that is, a lubrication step of causing the grease with which a space between the hub ring 3 and the outer ring 2 is filled to lubricate the ball 7 in the inner-side ball row 5 and the outer-side ball row 6 can be performed. This lubrication step can be performed using the drive source 14 as in the case of the lubrication step (S03). In this manner, resistance generated between the grease and the balls 7 when the hub ring 3 and the outer ring 2 are relatively rotated can be made constant, and when the rotational torque T2 of the bearing device for a vehicle wheel 1 is measured in the post-crimping rotational torque measurement step (S07), it is possible to further suppress occurrence of variations in the measured rotational torque T2.

However, in a case where the grease sufficiently lubricates the ball 7 by performing the lubrication step (S03) and resistance generated between the grease and the ball 7 is constant, the lubrication step between the crimping step (S06) and the post-crimping rotational torque measurement step (S07) can be omitted.

(Post-Crimping Rotational Torque Determination Step)

After the post-crimping rotational torque measurement step (S07), the post-crimping rotational torque determination step (S08) is performed. In the post-crimping rotational torque determination step (S08), appropriateness or inappropriateness of the rotational torque T2 is determined depending on whether or not the rotational torque T2 measured in the post-crimping rotational torque measurement step (S07) is within a range of a reference value S2. The reference value S2 is an example of a reference value used when appropriateness or inappropriateness of post-crimping rotational torque is determined. The post-crimping rotational torque determination step (S08) can be performed using the determination device 15 as in the case of the post-press-fitting rotational torque determination step (S05). In the post-crimping rotational torque determination step (S08), when the rotational torque T2 falls within a range of the reference value S2, the rotational torque T2 is determined to be appropriate, and when the rotational torque T2 exceeds the range of the reference value S2, the rotational torque T2 is determined not to be appropriate. The reference value S2 has a lower limit value and an upper limit value in a predetermined range, and can be set in advance. The reference value S2 can be set to the same value as the reference value S1, or can be set to a value different from the reference value S5.

As described above, by determining appropriateness or inappropriateness of rotational torque of the bearing device for a vehicle wheel 1 by using the rotational torque T2 measured in the post-crimping rotational torque measurement step (S07) performed after the crimping step (S06), it is possible to detect whether or not an abnormality occurs in a component such as the outer-side seal member 10 and a step such as the crimping step (S06) during a manufacturing process of the bearing device for a vehicle wheel 1. By the above, as compared with a case where appropriateness or inappropriateness of rotational torque is determined after the bearing device for a vehicle wheel 1 is in a completed state, it is possible to easily detect an abnormality in a component or a step that occurs during manufacture of the bearing device for a vehicle wheel, and it is possible to reduce the number of discarded components.

Further, rotational torque of the bearing when the hub ring 3 and the outer ring 2 are relatively rotated varies depending on variations in various conditions such as a dimension and hardness of the outer-side seal member 10, a fitting state to the outer ring 2 and the hub ring 3, viscosity and an application amount of grease, and temperature of the bearing device for a vehicle wheel 1 at which rotational torque is measured. Therefore, the reference value S2 can be set in consideration of variations in these conditions.

In particular, in a case where temperature of the bearing device for a vehicle wheel 1 changes, a measured value of rotational torque fluctuates greatly. For this reason, after a measured value of the rotational torque T2 is corrected according to temperature of the bearing device for a vehicle wheel 1, appropriateness or inappropriateness of the rotational torque T2 can be determined. For example, in a case where the small-diameter step portion 3a of the hub ring 3 is crimped to the inner-side end surface 4b of the inner ring 4 in the crimping step (S06), temperature of the inner ring 4 increases and rotational torque of the bearing device for a vehicle wheel 1 increases, so that a measured value of the rotational torque T2 can be corrected by a rotational torque value corresponding to the temperature increase. As described above, by correcting a measured value of the rotational torque T2 according to temperature of the bearing device for a vehicle wheel 1 at which the rotational torque T2 is measured, it is possible to determine appropriateness or inappropriateness of the rotational torque T2 with high accuracy.

(Inner-Side Seal Member Mounting Step)

Figure 8:
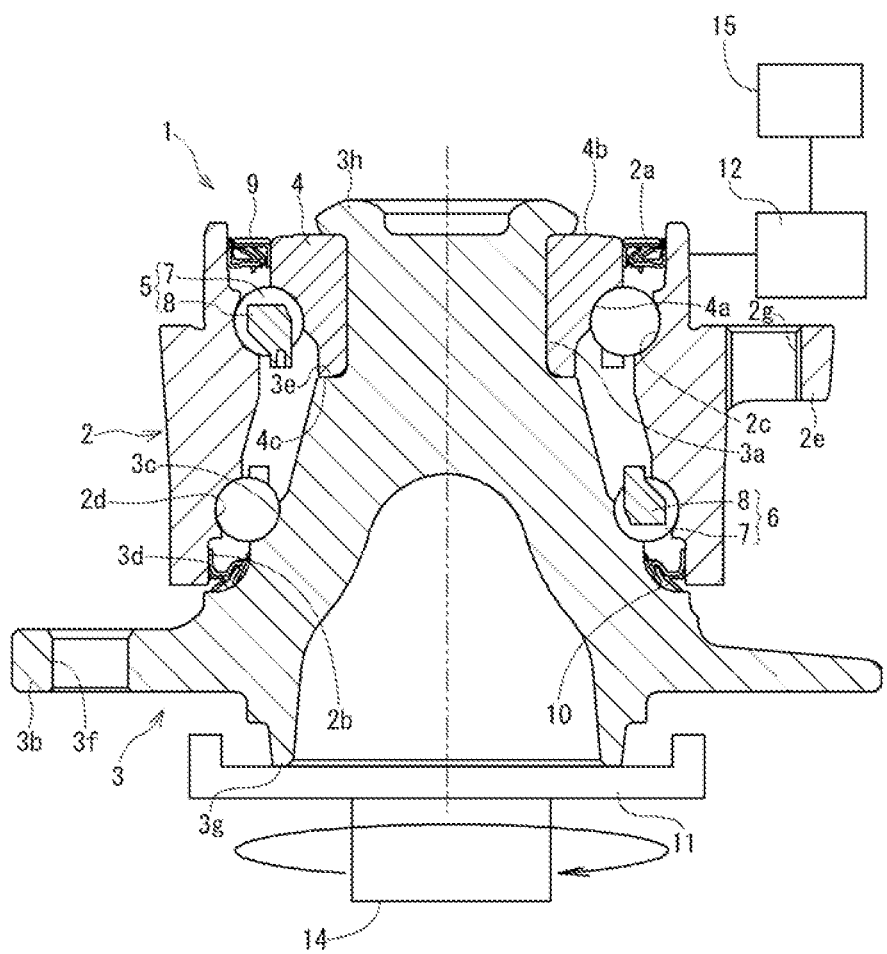
FIG. 8 is a side cross-sectional view illustrating the bearing device for a vehicle wheel according to the first embodiment in a state where an inner-side seal member is attached to an inner-side end portion of an outer ring.

After the post-crimping rotational torque determination step (S08), the inner-side seal member mounting step (S09) is performed. As illustrated in FIG. 8, in the inner-side seal member mounting step (S09), the inner-side seal member 9 is mounted between an inner-side end portion of the outer ring 2 and an inner-side end portion of the inner ring 4 as the inner-side seal member 9 is fitted to the inner-side opening portion 2a of the outer ring 2. In this case, for example, the inner-side seal member 9 can be mounted to the inner-side opening portion 2a by using a mounting tool (not illustrated) of the seal member. That is, the inner-side seal member mounting step (S09) can be performed by using the mounting tool of the seal member.

When the inner-side seal member 9 is mounted before the crimping step (S06), sliding resistance between the outer ring 2 and the inner ring 4 of the inner-side seal member 9 changes depending on degree of crimping of the hub ring 3 in the crimping step (S06). Further, when the inner-side seal member 9 is mounted before the post-crimping rotational torque measurement step (S07) even after the crimping step (S06), the sliding resistance between the outer ring 2 and the inner ring 4 of the inner-side seal member 9 changes depending on a mounting state of the inner-side seal member 9.

Therefore, when the inner-side seal member 9 is mounted before the crimping step (S06) or the post-crimping rotational torque measurement step (S07), there may be influence on variations in the rotational torque T2 measured in the post-crimping rotational torque measurement step (S07). Similarly, in a case where the inner-side seal member 9 is mounted before the post-press-fitting rotational torque measurement step (S04), the mounting state of the inner-side seal member 9 may affect variations in the rotational torque T1 measured in the post-press-fitting rotational torque measurement step (S04).

However, in the present embodiment, the inner-side seal member mounting step (S09) is performed after the post-crimping rotational torque measurement step (S07). Therefore, when the rotational torque T1 and the rotational torque T2 of the bearing device for a vehicle wheel 1 are measured in the post-press-fitting rotational torque measurement step (S04) and the post-crimping rotational torque measurement step (S07), variations in the rotational torque due to the influence of the inner-side seal member 9 are not generated, and the rotational torque of the bearing device for a vehicle wheel 1 can be measured with high accuracy.

(Post-Seal Member Mounting Rotational Torque Measurement Step)

After the inner-side seal member mounting step (S09), the post-seal member mounting rotational torque measurement step (S10) is performed. In the post-seal member mounting rotational torque measurement step (S10), as in the post-press-fitting rotational torque measurement step (S04) and the post-crimping rotational torque measurement step (S07), rotational torque is measured in a state where a dynamic frictional force is generated between the inner members 3 and 4 and the outer member 2. In the post-seal member mounting rotational torque measurement step (S10), the torque measuring instrument 12 measures rotational torque T3 when the hub ring 3 in which the small-diameter step portion 3a is crimped to the inner ring 4 and the outer ring 2 are relatively rotated by the drive source 14. As described above, the post-seal member mounting rotational torque measurement step (S10) can be performed using the drive source 14 and the torque measuring instrument 12. The rotational torque T3 is post-seal member mounting rotational torque measured after the inner-side seal member mounting step (S09). In the post-seal member mounting rotational torque measurement step (S10), the hub ring 3 may be rotated while the outer ring 2 is fixed, or the outer ring 2 may be rotated while the hub ring 3 is fixed.

However, as in the case of the post-press-fitting rotational torque measurement step (S04) and the post-crimping rotational torque measurement step (S07), it is preferable to rotate the hub ring 3 because variations in a rotational torque value measured when a rotational speed of the hub ring 3 changes are reduced. Further, also in the post-seal member mounting rotational torque measurement step (S10), the rotational torque can be measured with high accuracy as in the case of the post-press-fitting rotational torque measurement step (S04) and the post-crimping rotational torque measurement step (S07), by measuring the rotational torque instead of the starting torque of the bearing, and measuring the rotational torque T3 while the hub ring 3 or the outer ring 2 is rotated at a constant rotational speed at the low rotational speeds N1 to N2.

Further, between the inner-side seal member mounting step (S09) and the post-seal member mounting rotational torque measurement step (S10), a step similar to the lubrication step (S03), that is, a lubrication step of causing the grease with which a space between the hub ring 3 and the outer ring 2 is filled to lubricate the ball 7 in the inner-side ball row 5 and the outer-side ball row 6 can be performed. This lubrication step can be performed using the drive source 14 as in the case of the lubrication step (S03). In this manner, resistance generated between the grease and the balls 7 when the hub ring 3 and the outer ring 2 are relatively rotated can be made constant, and when the rotational torque T3 of the bearing device for a vehicle wheel 1 is measured in the post-seal member mounting rotational torque measurement step (S10), it is possible to further suppress occurrence of variations in the measured rotational torque T3.

However, in a case where the grease sufficiently lubricates the ball 7 by performing the lubrication step (S03) and resistance generated between the grease and the ball 7 is constant, the lubrication step between the inner-side seal member mounting step (S09) and the post-seal member mounting rotational torque measurement as step (S10) can be omitted.

(Post-Seal Member Mounting Rotational Torque Determination Step)

After the post-seal member mounting rotational torque measurement step (S10), the post-seal member mounting rotational torque determination step (S11) is performed. In the post-seal member mounting rotational torque determination step (S11), appropriateness or inappropriateness of the rotational torque T3 is determined depending on whether or not the rotational torque T3 measured in the post-seal member mounting rotational torque measurement step (S10) is within a range of a reference value S3. The reference value S3 is a reference value used when appropriateness or inappropriateness of the post-seal member mounting rotational torque is determined. The post-seal member mounting rotational torque determination step (S11) can be performed using the determination device 15 as in the case of the post-press-fitting rotational torque determination step (S05). In the post-seal member mounting rotational torque determination step (S11), when the rotational torque T3 falls within a range of the reference value S3, the rotational torque T3 is determined to be appropriate, and when the rotational torque T3 exceeds the range of the reference value S3, the rotational torque T3 is determined not to be appropriate. The reference value S3 has a lower limit value and an upper limit value in a predetermined range, and can be set in advance.

As described above, by determining appropriateness or inappropriateness of rotational torque of the bearing device for a vehicle wheel 1 by using the rotational torque T3 measured in the post-seal member mounting rotational torque measurement step (S10) performed after the inner-side seal member mounting step (S09), it is possible to detect whether or not an abnormality occurs in a component such as the inner-side seal member 9 and a step such as the inner-side seal member mounting step (S09). This makes it possible to easily detect in which component or in which step an abnormality occurs.

In the post-seal member mounting rotational torque determination step (S11), the reference value S3 can be set in consideration of rotational torque of the bearing device for a vehicle wheel 1 that increases as the inner-side seal member 9 is fitted into the inner-side opening portion 2a of the outer ring 2. As described above, by setting the reference value S3 in consideration of rotational torque increased by the inner-side seal member 9, appropriateness or inappropriateness of the rotational torque T3 can be determined with high accuracy.

Further, in the post-seal member mounting rotational torque determination step (S11), as in the post-press-fitting rotational torque determination step (S05) and the post-crimping rotational torque determination step (S08), the reference value S3 can be set in consideration of variations in various conditions such as the outer-side seal member 10, the grease, and temperature of the bearing device for a vehicle wheel 1. This makes it possible to determine appropriateness or inappropriateness of the rotational torque T3 with high accuracy.

Furthermore, a measured value of the rotational torque T3 can be corrected according to temperature of the bearing device for a vehicle wheel 1 at which the rotational torque T3 is measured. This makes it possible to determine appropriateness or inappropriateness of the rotational torque T3 with high accuracy.

Note that, in the rotational torque inspection method in the present embodiment, the post-press-fitting rotational torque determination step (S05), the post-crimping rotational torque determination step (S08), and the post-seal member mounting rotational torque determination step (S11) are performed, but the configuration can be such that only the post-press-fitting rotational torque determination step (S05) and the post-crimping rotational torque determination step (S08) are performed. Further, the configuration can be such that only one of the post-press-fitting rotational torque determination step (S05) and the post-crimping rotational torque determination step (S08) is performed.

First Embodiment Of Rotational Torque Inspection Device

The rotating torque inspection method according to the first embodiment described above can be performed by a rotational torque inspection device including the torque measuring instrument 12, the pushing device 13, the drive source 14, the determination device 15, and the crimping die 16.

For example, the rotational torque inspection device can perform the press-fitting step (S02) of press-fitting the inner ring 4 into the small-diameter step portion 3a of the hub ring 3 to a position where the inner ring 4 abuts on the hub ring 3 in the axial direction by using the pushing device 13. Further, the rotational torque inspection device can perform the post-press-fitting rotational torque measurement step (S04) of measuring the rotational torque T1, which is post-press-fitting rotational torque of the bearing device for a vehicle wheel 1 when the inner members 3 and 4 and the outer member 2 are relatively rotated after the press-fitting step (S02), by using the drive source 14 and the torque measuring instrument 12. Furthermore, the rotational torque inspection device can perform the post-press-fitting rotational torque determination step (S05) of determining appropriateness or inappropriateness of the rotational torque T1 depending on whether or not the rotational torque T1 measured in the post-press-fitting rotational torque measurement step (S04) falls within a range of the reference value S1 by using the determination device 15.

Further, the rotational torque inspection device can perform the crimping step (S06) of crimping an inner-side end portion of the small-diameter step portion 3a into which the inner ring 4 is press-fitted to the inner ring 4 by using the crimping die 16. Furthermore, the rotational torque inspection device can perform the post-crimping rotational torque measurement step (S07) of measuring the rotational torque T2, which is post-crimping rotational torque of the bearing device for a vehicle wheel 1 when the inner members 3 and 4 and the outer member 2 are relatively rotated after the crimping step (S06), by using the determination device 15. Further, the rotational torque inspection device can perform the post-crimping rotational torque determination step (S08) of determining appropriateness or inappropriateness of the rotational torque T2 depending on whether the rotational torque T2 measured in the post-crimping rotational torque measurement step (S07) falls within a range of the reference value S2 by using the determination device 15.

Second Embodiment of Bearing Device for Vehicle Wheel

Hereinafter, a bearing device for a vehicle wheel 1A as a second embodiment of the bearing device for a vehicle wheel for which the rotational torque inspection method according to the present invention is performed will be described with reference to FIG. 9.

Figure 9:
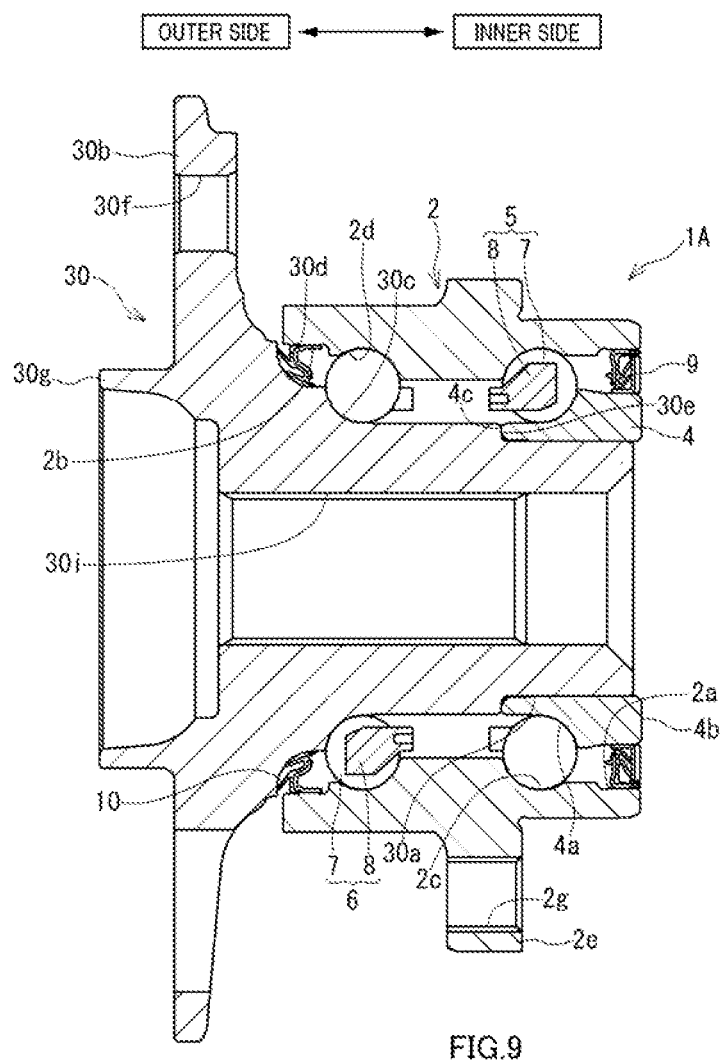
FIG. 9 is a side cross-sectional view illustrating a second embodiment of the bearing device for a vehicle wheel for which the rotational torque inspection method is performed.

The bearing device for a vehicle wheel 1A illustrated in FIG. 9 rotatably supports a driving wheel in a suspension device of a vehicle such as an automobile. The bearing device for a vehicle wheel 1A has a "third generation" configuration, and includes the outer ring 2 that is an outer member, a hub ring 30 and the inner ring 4 that are inner members, two rows of the inner-side ball row 5 and the outer-side ball row 6 that are rolling rows, and the inner-side seal member 9 and the outer-side seal member 10.

The bearing device for a vehicle wheel 1A is different from the bearing device for a vehicle wheel 1 including the hub ring 3 in which a through-hole is not formed in that the bearing device for a vehicle wheel 1A includes the hub ring 30 in which a through-hole 30i through which a drive shaft of a vehicle passes is formed. Since the configurations other than the hub ring 30 in the bearing device for a vehicle wheel 1A is similar to those of the bearing device for a vehicle wheel 1, description of such configurations will be omitted.

In an inner-side end portion of the hub ring 30, a small-diameter step portion 30a whose diameter is smaller than that of an outer-side end portion is formed on an outer peripheral surface. The small-diameter step portion 30a extends in the axial direction, and a shoulder portion 30e is formed in an outer-side end portion of the small-diameter step portion 30a of the hub ring 30. A vehicle wheel mounting flange 30b for mounting a wheel is integrally formed in an outer-side end portion of the hub ring 30. The vehicle wheel mounting flange 30b is provided with a bolt hole 30f into which a hub bolt for fastening the hub ring 30 and a wheel or a brake component is press-fitted.

The hub ring 30 is provided with an inner raceway surface 30c on the outer side in a manner facing the outer raceway surface 2d on the outer side of the outer ring 2. A lip sliding surface 30d with which the outer-side seal member 10 comes into sliding contact is formed on the base portion side of the vehicle wheel mounting flange 30b of the hub ring 30. The outer-side seal member 10 is fitted to an outer-side opening end of an annular space formed by the outer ring 2 and the hub ring 30. The hub ring 30 has an outer-side end surface 30g in an end portion further on the outer side than the vehicle wheel mounting flange 30b.

The inner ring 4 is provided on the small-diameter step portion 30a of the hub ring 30. The inner ring 4 is fixed by being press-fitted into the small-diameter step portion 30a of the hub ring 30. The small-diameter step portion 30a of the hub ring 30 is not crimped to the inner-side end surface 4b of the inner ring 4. That is, the bearing device for a vehicle wheel 1A is a bearing device for a driving wheel configured to have a specification in which the crimping processing is not performed on an inner-side end portion of the hub ring 30.

Second Embodiment of Rotational Torque Inspection Method

Figure 10:
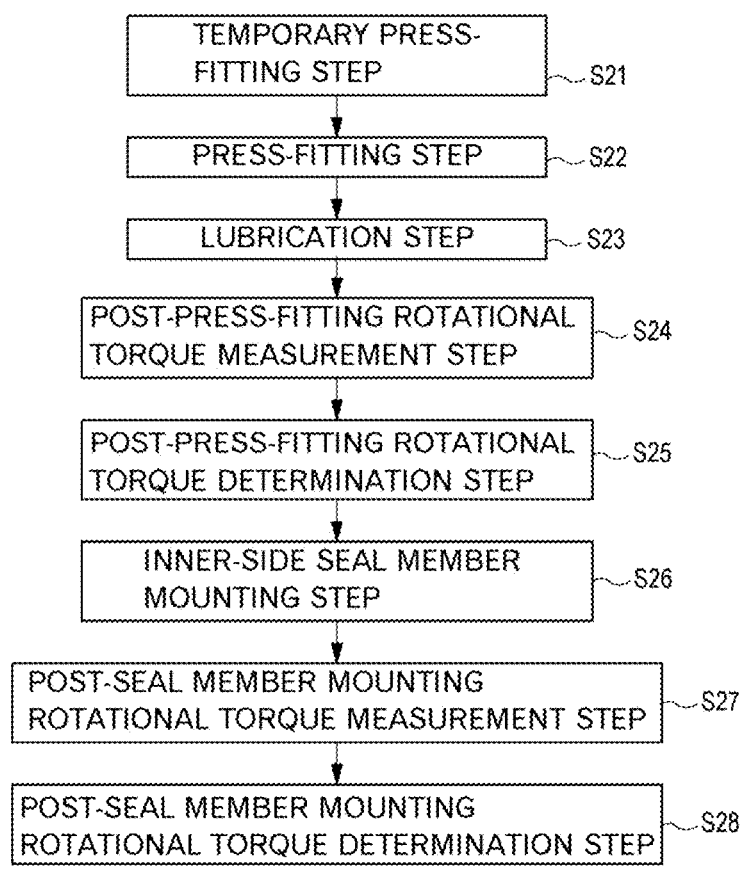
FIG. 10 is a diagram illustrating a process of the rotational torque inspection method according to the second embodiment.

Next, the rotational torque inspection method of the bearing device for a vehicle wheel 1A according to the second embodiment of the rotational torque inspection method of the present invention will be described. As illustrated in FIG. 10, the rotational torque inspection method in the present embodiment is mainly performed during assembly of the bearing device for a vehicle wheel 1A. Specifically, the rotational torque inspection method includes a temporary press-fitting step (S21), a press-fitting step (S22), a lubrication step (S23), a post-press-fitting rotational torque measurement step (S24), a post-press-fitting rotational torque determination step (S25), an inner-side seal member mounting step (S26), a post-seal member mounting rotational torque measurement step (S27), and a post-seal member mounting rotational torque determination step (S28). Each step of the rotational torque inspection method will be described below.

(Temporary Press-Fitting Step)

Figure 11:
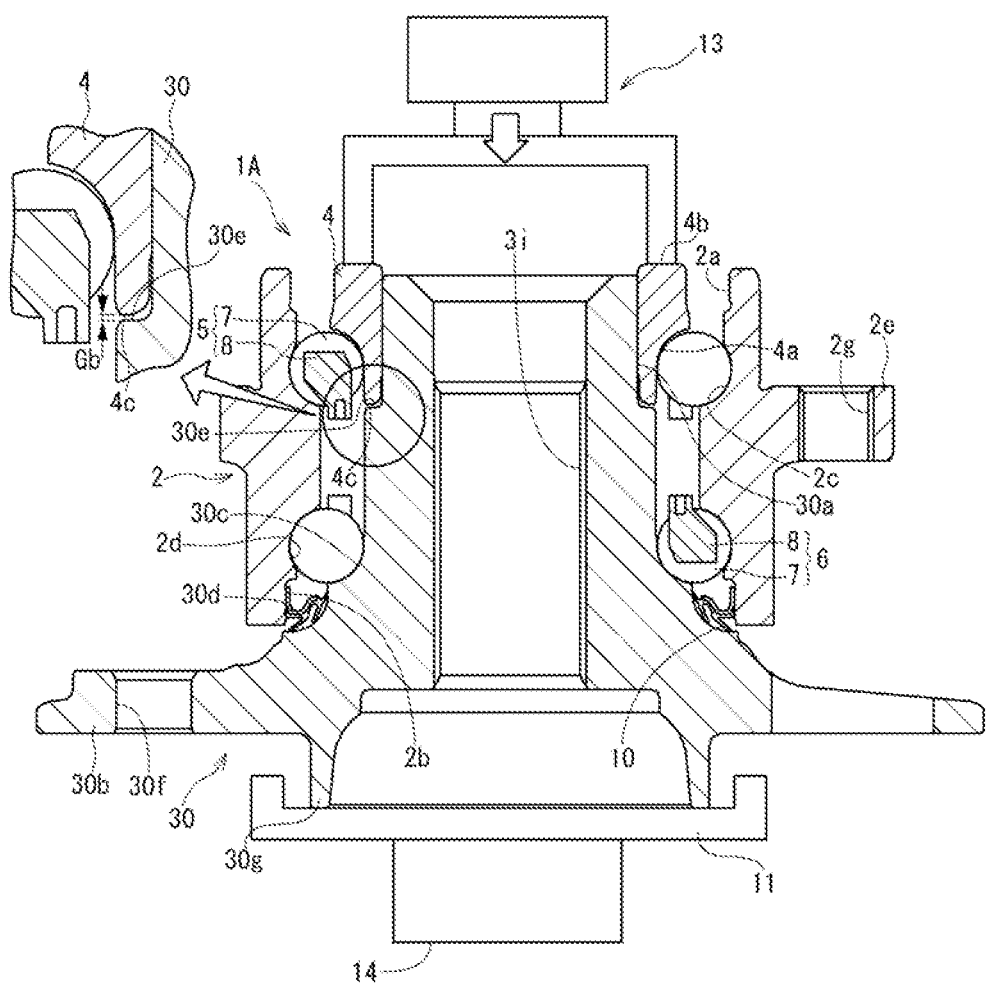
FIG. 11 is a side cross-sectional view illustrating the bearing device for a vehicle wheel according to the second embodiment in a state where the inner ring is temporarily press-fitted into the small-diameter step portion of the hub ring.

As illustrated in FIG. 11, the hub ring 30 is placed on the support base 11 in a posture in which the axial direction is the vertical direction and the outer-side end surface 30g is positioned downward. The outer-side end surface 30g of the hub ring 30 is grounded to the support base 11. The outer ring 2 is rotatably mounted on the hub ring 30 placed on the support base 11 via the inner-side ball row 5 and the outer-side ball row 6. The outer-side seal member 10 is fitted to an outer-side end portion of the outer ring 2. A space between the hub ring 30 and the outer ring 2 is filled with grease.

In the temporary press-fitting step (S21), as in the case of the temporary press-fitting step (S01), the inner ring 4 is temporarily press-fitted into the small-diameter step portion 30a of the hub ring 30. At a time point at which the temporary press-fitting of the inner ring 4 is completed, an axial positive gap Gb exists between the outer-side end surface 4c of the inner ring 4 and the shoulder portion 30e of the hub ring 30. The temporary press-fitting step (S21) can be performed using the pushing device 13 as in the case of the temporary press-fitting step (S01).

(Press-Fitting Step)

Figure 12:
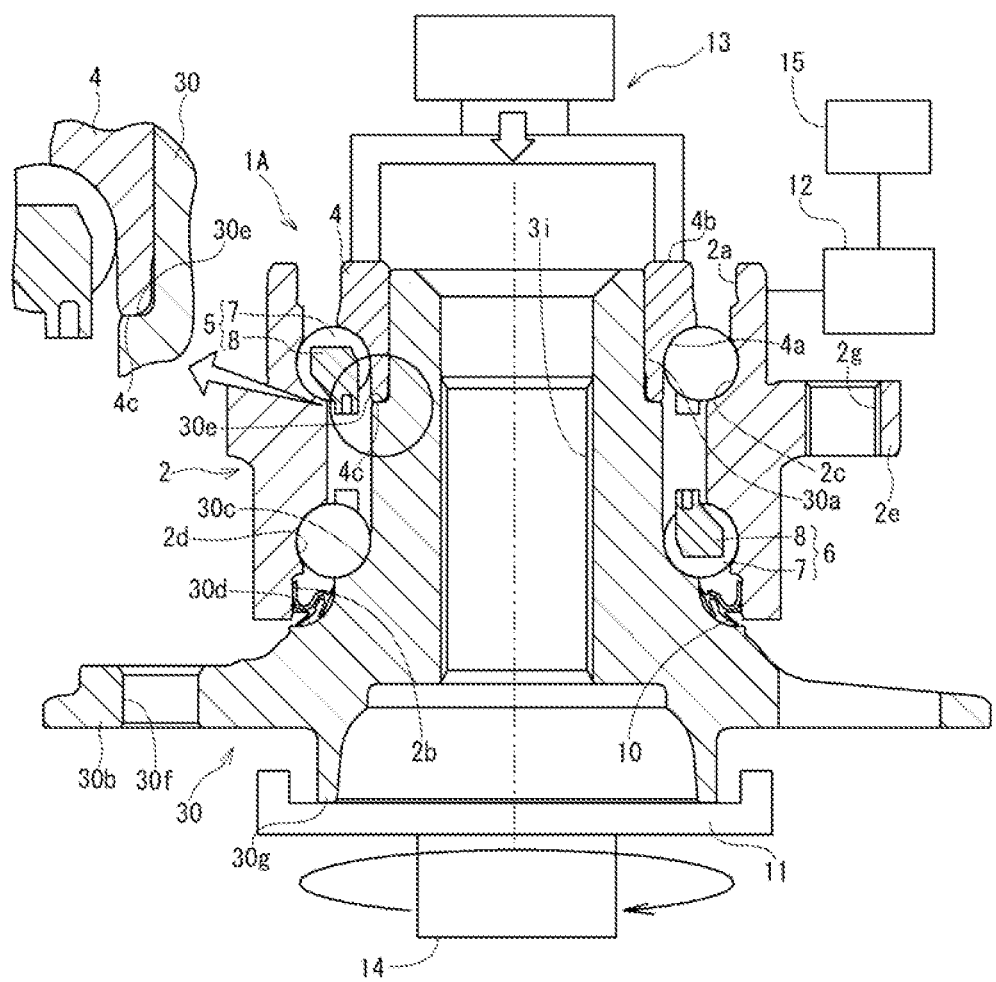
FIG. 12 is a side cross-sectional view illustrating the bearing device for a vehicle wheel according to the second embodiment in a state where the inner ring is press-fitted into the small-diameter step portion of the hub ring.

After the temporary press-fitting step (S21), the press-fitting step (S22) is performed. As illustrated in FIG. 12, in the press-fitting step (S22), the inner ring 4 is press-fitted into the small-diameter step portion 30a of the hub ring 30 as in the case of the press-fitting step (S02). The press-fitting step (S22) can be performed by using the pushing device 13 as in the case of the press-fitting step (S02). After the inner ring 4 is press-fitted into the small-diameter step portion 30a in the press-fitting step (S22), axial negative gaps are generated between the inner-side ball row 5, an inner-side outer ring raceway surface 2c, and the inner ring raceway surface 4a, and between the outer-side ball row 6, the outer-side outer ring raceway surface 2d, and the hub ring raceway surface 30c.

(Lubrication Step)

After the press-fitting step (S22), the lubrication step (S23) is performed. In the lubrication step (S23), as in the case of the lubrication step (S03), the hub ring 30 into which the inner ring 4 is press-fitted and the outer ring 2 are relatively rotated, so that the balls 7 of the inner-side ball row 5 and the outer-side ball row 6 are lubricated with the grease with which a space between the hub ring 30 and the outer ring 2 is filled. The lubrication step (S23) can be performed using the drive source 14 as in the case of the lubrication step (S03).

By performing the lubrication step (S23), the resistance generated between the grease and the ball 7 can be made constant when the hub ring 30 and the outer ring 2 are relatively rotated. In this manner, when the rotational torque of the bearing device for a vehicle wheel 1A is measured in the post-press-fitting rotational torque measurement step (S24) and the post-seal member mounting rotational torque measurement step (S27) that are performed later, it is possible to suppress variations in the measured rotational torque. Further, by relatively rotating the hub ring 30 and the outer ring 2 by 30 rotations or more, it is possible to effectively suppress variations in the measured rotational torque.

(Post-Press-Fitting Rotational Torque Measurement Step)

The post-press-fitting rotational torque measurement step (S24) is performed after the lubrication step (S23). In the post-press-fitting rotational torque measurement step (S24), as in the case of the post-press-fitting rotational torque measurement step (S04), the torque measuring instrument 12 measures rotational torque T4 when the hub ring 30 with the inner ring 4 press-fitted into the small-diameter step portion 30a and the outer ring 2 are relatively rotated by the drive source 14. As described above, the post-press-fitting rotational torque measurement step (S24) can be performed using the drive source 14 and the torque measuring instrument 12. The rotational torque T4 is an example of post-press-fitting rotational torque. The rotational torque T4 is rotational torque measured after the press-fitting step (S22) and before the inner-side seal member mounting step (S26) in a state where the crimping processing is not performed on an inner-side end portion of the hub ring 30.

In the post-press-fitting rotational torque measurement step (S24), a rotational speed of the hub ring 30 or the outer ring 2 is set in a range of the rotational speeds N1 to N2 in a region where decreasing rotational torque turns to increase. In the present embodiment, the rotational speed N1, which is a lower limit of a range of a rotational speed, is set to 10 rotations/min. The rotational speed N2, which is an upper limit value of a range of a rotational speed, is set to 30 rotations/min. In this manner, even if the rotational speed changes during measurement of the rotational torque T4, a fluctuation of the rotational torque T4 can be reduced, and the rotational torque can be stably measured.

Further, in the post-press-fitting rotational torque measurement step (S24), the rotational torque T4 of the bearing device for a vehicle wheel 1A is measured in a state where the outer-side seal member 10 is fitted to an outer-side opening end of an annular space formed by the outer ring 2 and the hub ring 30. Here, the outer-side seal member 10 is located axially on the opposite side to the small-diameter step portion 30a of the hub ring 30 that is press-fitted to the inner ring 4. Therefore, even if an abnormality occurs in the inner ring raceway surface 4a or the like, seal torque of the outer-side seal member 10 is hardly affected and the rotational torque of the bearing device for a vehicle wheel 1A is also hardly changed.

(Post-Press-Fitting Rotational Torque Determination Step)

After the post-press-fitting rotational torque measurement step (S24), the post-press-fitting rotational torque determination step (S25) is performed. In the post-press-fitting rotational torque determination step (S25), as in the case of the post-press-fitting rotational torque determination step (S05), appropriateness or inappropriateness of the rotational torque T4 is determined depending on whether or not the rotational torque T4 measured in the post-press-fitting rotational torque measurement step (S24) is within a range of a reference value S4. The post-press-fitting rotational torque determination step (S25) can be performed using the determination device 15. The reference value S4 is an example of a reference value used when appropriateness or inappropriateness of post-press-fitting rotational torque is determined. The reference value S4 has a lower limit value and an upper limit value in a predetermined range, and can be set in advance.

As described above, by determining appropriateness or inappropriateness of rotational torque of the bearing device for a vehicle wheel 1A by using the rotational torque T4 measured in the post-press-fitting rotational torque measurement step (S24), it is possible to detect whether or not an abnormality occurs in a component such as the outer-side seal member 10 and a step such as the press-fitting step (S22) during a manufacturing process of the bearing device for a vehicle wheel 1A. By the above, as compared with a case where appropriateness or inappropriateness of rotational torque is determined after the bearing device for a vehicle wheel 1A is in a completed state, it is possible to easily detect in which component or in which step an abnormality occurs, and it is possible to reduce the number of discarded components.

Further, in the post-press-fitting rotational torque determination step (S25), as in the case of the post-press-fitting rotational torque determination step (S05), the reference value S4 can be set in consideration of variations in various conditions such as the outer-side seal member 10, the grease, and temperature of the bearing device for a vehicle wheel 1A. Furthermore, a measured value of the rotational torque T4 can be corrected according to temperature of the bearing device for a vehicle wheel 1A at which the rotational torque T4 is measured. This makes it possible to determine appropriateness or inappropriateness of the rotational torque T4 with high accuracy.

(Inner-Side Seal Member Mounting Step)

Figure 13:
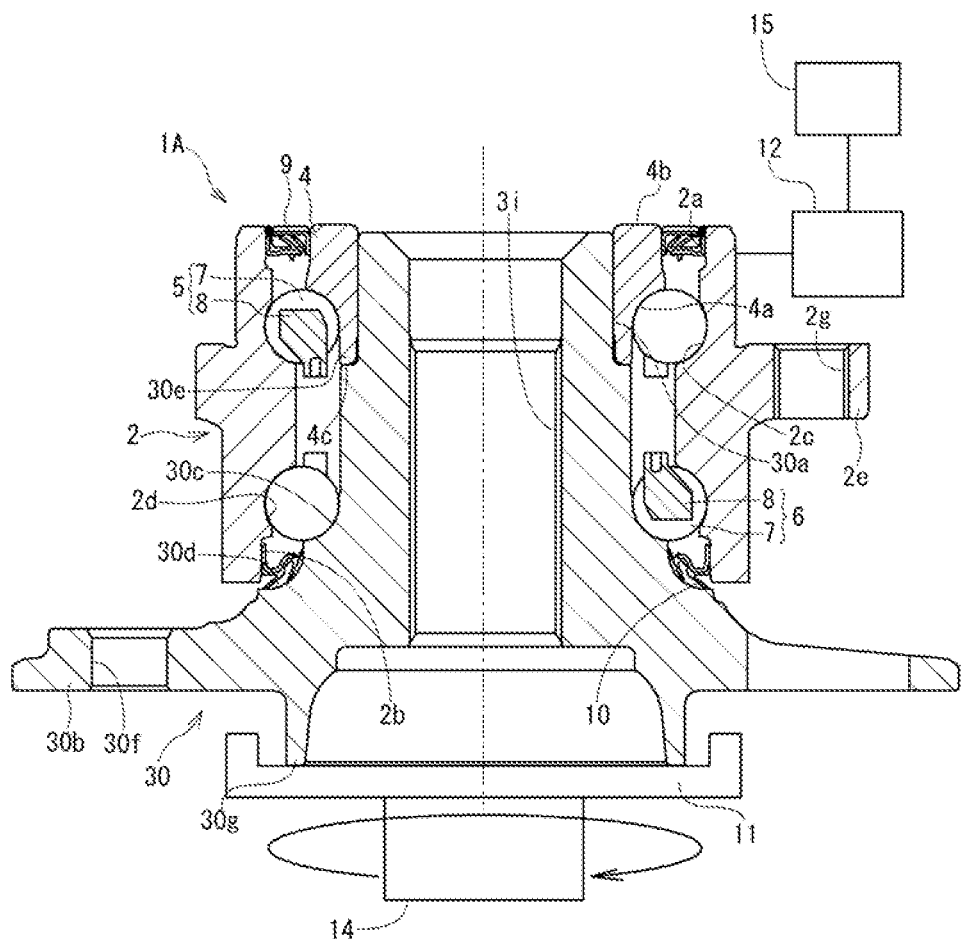
FIG. 13 is a side cross-sectional view illustrating the bearing device for a vehicle wheel according to the second embodiment in a state where the inner-side seal member is attached to an inner-side end portion of the outer ring.

After the post-press-fitting rotational torque determination step (S25), the inner-side seal member mounting step (S26) is performed. As illustrated in FIG. 13, in the inner-side seal member mounting step (S26), as in the case of the inner-side seal member mounting step (S09), the inner-side seal member 9 is mounted between an inner-side end portion of the outer ring 2 and an inner-side end portion of the inner ring 4. In this case, for example, the inner-side seal member 9 can be mounted between an inner-side end portion of the outer ring 2 and an inner-side end portion of the inner ring 4 by using a mounting tool (not illustrated) of the seal member. That is, the inner-side seal member mounting step (S26) can be performed by using the mounting tool of the seal member.

(Post-Seal Member Mounting Rotational Torque Measurement Step)

After the inner-side seal member mounting step (S26), the post-seal member mounting rotational torque measurement step (S27) is performed. In the post-seal member mounting rotational torque measurement step (S27), as in the case of the post-press-fitting rotational torque measurement step (S24), rotational torque is measured in a state where a dynamic frictional force is generated between the inner members 30 and 4 and the outer member 2. In the post-seal member mounting rotational torque measurement step (S27), the torque measuring instrument 12 measures rotational torque T5 when the hub ring 30 in which the small-diameter step portion 30a is crimped to the inner ring 4 and the outer ring 2 are relatively rotated by the drive source 14. As described above, the post-seal member mounting rotational torque measurement step (S27) can be performed using the drive source 14 and the torque measuring instrument 12. The rotational torque T5 is post-seal member mounting rotational torque measured after the inner-side seal member mounting step (S26).

In the post-seal member mounting rotational torque measurement step (S27), the rotational torque can be measured with high accuracy as in the case of the post-press-fitting rotational torque measurement step (S24), by measuring the rotational torque instead of the starting torque of the bearing, and measuring the rotational torque T5 while the hub ring 30 or the outer ring 2 is rotated at a constant rotational speed at the low rotational speeds N1 to N2.

Further, between the inner-side seal member mounting step (S26) and the post-seal member mounting rotational torque measurement step (S27), a step similar to the lubrication step (S23), that is, a lubrication step of causing the grease with which a space between the hub ring 30 and the outer ring 2 is filled to lubricate the ball 7 in the inner-side ball row 5 and the outer-side ball row 6 can be performed. This lubrication step can be performed using the drive source 14 as in the case of the lubrication step (S23). In this manner, resistance generated between the grease and the balls 7 when the hub ring 30 and the outer ring 2 are relatively rotated can be made constant, and when the rotational torque T5 of the bearing device for a vehicle wheel 1A is measured in the post-seal member mounting rotational torque measurement step (S27), it is possible to further suppress occurrence of variations in the measured rotational torque T5.

However, in a case where the grease sufficiently lubricates the ball 7 by performing the lubrication step (S23) and resistance generated between the grease and the ball 7 is constant, the lubrication step between the inner-side seal member mounting step (S26) and the post-seal member mounting rotational torque measurement step (S27) can be omitted.

(Post-Seal Member Mounting Rotational Torque Determination Step)

After the post-seal member mounting rotational torque measurement step (S27), the post-seal member mounting rotational torque determination step (S28) is performed. In the post-seal member mounting rotational torque determination step (S28), as in the case of the post-press-fitting rotational torque determination step (S25), appropriateness or inappropriateness of the rotational torque T5 is determined depending on whether or not the rotational torque T5 measured in the post-seal member mounting rotational torque measurement step (S27) is within a range of a reference value S5. The reference value S5 is a reference value used when appropriateness or inappropriateness of the post-seal member mounting rotational torque is determined. The post-seal member mounting rotational torque determination step (S28) can be performed using the determination device 15. The reference value S5 has a lower limit value and an upper limit value in a predetermined range, and can be set in advance. The reference value S5 can be set to the same value as the reference value S4, or can be set to a value different from the reference value S4.

As described above, by determining appropriateness or inappropriateness of rotational torque of the bearing device for a vehicle wheel 1A by using the rotational torque T5 measured in the post-seal member mounting rotational torque measurement step (S27) performed after the inner-side seal member mounting step (S26), it is possible to detect whether or not an abnormality occurs in a component such as the inner-side seal member 9 and a step such as the inner-side seal member mounting step (S26). This makes it possible to easily detect in which component or in which step an abnormality occurs.

In the post-seal member mounting rotational torque determination step (S28), the reference value S5 can be set in consideration of rotational torque of the bearing device for a vehicle wheel 1A that increases as the inner-side seal member 9 is fitted into the inner-side opening portion 2a of the outer ring 2. As described above, by setting the reference value S5 in consideration of rotational torque increased by the inner-side seal member 9, appropriateness or inappropriateness of the rotational torque T5 can be determined with high accuracy.

Further, in the post-seal member mounting rotational torque determination step (S28), as in the case of the post-press-fitting rotational torque determination step (S25), the reference value S5 can be set in consideration of variations in various conditions such as the outer-side seal member 10, the grease, and temperature of the bearing device for a vehicle wheel 1. Furthermore, a measured value of the rotational torque T5 can be corrected according to temperature of the bearing device for a vehicle wheel 1A at which the rotational torque T5 is measured. This makes it possible to determine appropriateness or inappropriateness of the rotational torque T5 with high accuracy.

Note that, in the rotational torque inspection method in the present embodiment, the post-press-fitting rotational torque determination step (S25) and the post-seal member mounting rotational torque determination step (S28) are performed, but the configuration can be such that only the post-press-fitting rotational torque determination step (S25) is performed.

Second Embodiment of Rotational Torque Inspection Device

The rotating torque inspection method according to the second embodiment described above can be performed by a rotational torque inspection device including the torque measuring instrument 12, the pushing device 13, the drive source 14, and the determination device 15.

For example, the rotational torque inspection device can perform the press-fitting step (S22) of press-fitting the inner ring 4 into the small-diameter step portion 3a of the hub ring 3 to a position where the inner ring 4 abuts on the hub ring 3 in the axial direction by using the pushing device 13. Further, the rotational torque inspection device can perform the post-press-fitting rotational torque measurement step (S24) of measuring the rotational torque T4, which is post-press-fitting rotational torque of the bearing device for a vehicle wheel 1 when the inner members 3 and 4 and the outer member 2 are relatively rotated after the press-fitting step (S22), by using the drive source 14 and the torque measuring instrument 12. Furthermore, the rotational torque inspection device can perform the post-press-fitting rotational torque determination step (S25) of determining appropriateness or inappropriateness of the rotational torque T4 depending on whether or not the rotational torque T4 measured in the post-press-fitting rotational torque measurement step (S24) falls within a range of the reference value S4 by using the determination device 15.

Although the embodiments of the present invention are described above, the present invention is not limited to such embodiments in any way, and the embodiments are merely an example. As a matter of course, the present invention can be implemented in various forms without departing from the gist of the present invention. The scope of the present invention is indicated by the description of the claims, and further includes the equivalent meaning to and all changes within the scope of the claims.

INDUSTRIAL APPLICABILITY

The present invention is applicable to a bearing device for a vehicle wheel.

REFERENCE SIGNS LIST 1, 1A bearing device for a vehicle wheel
2 outer ring
2c outer raceway surface (on inner side)
2d outer raceway surface (on outer side)
3, 30 hub ring
3a, 30a small-diameter step portion
3c, 30c inner raceway surface
3h crimped portion
4 inner ring
4a inner raceway surface
4b inner-ring inner-side end portion
4c inner-ring inner-side end portion
5 inner-side ball row
6 outer-side ball row
7 ball
9 inner-side seal member
10 outer-side seal member
12 torque measuring instrument
Ga, Gb axial positive gap
N1, N2 rotational speed
T1, T4 rotational torque (post-press-fitting rotational torque)
T2 rotational torque (post-crimping rotational torque)
T3, T5 rotational torque (post-seal member mounting rotational torque)
S1, S4 reference value (reference value when post-press-fitting rotational torque is determined)
S2 reference value (reference value when post-crimping rotational torque is determined)
S3, S5 reference value (reference value when post-seal member mounting rotational torque is determined)
S01, S21 temporary press-fitting step
S02, S22 press-fitting step
S03, S23 lubrication step
S04, S24 post-press-fitting rotational torque measurement step
S05, S25 post-press-fitting rotational torque determination step
S06 crimping step
S07 post-crimping rotational torque measurement step
S08 post-crimping rotational torque determination step

The invention claimed is:

1. A rotational torque inspection method for a bearing device for a vehicle wheel including:
an outer member having a plurality of rows of outer raceway surfaces on an inner periphery;
an inner member including a hub ring having a small-diameter step portion extending in an axial direction on an outer periphery and an inner ring press-fitted into the small-diameter step portion of the hub ring, the inner member having a plurality of rows of inner raceway surfaces facing the plurality of rows of outer raceway surfaces; and a plurality of rows of rolling bodies rollably accommodated between both raceway surfaces of the outer member and the inner member, the rotational torque inspection method comprising:

a press-fitting step of press-fitting the inner ring into the small-diameter step portion of the hub ring to a position where the inner ring abuts on the hub ring in the axial direction;

a post-press-fitting rotational torque measurement step of measuring post-press-fitting rotational torque of the bearing device for a vehicle wheel when the inner member and the outer member are relatively rotated after the press-fitting step; and a post-press-fitting rotational torque determination step of determining appropriateness or inappropriateness of the post-press-fitting rotational torque depending on whether or not the post-press-fitting rotational torque measured in the post-press-fitting rotational torque measurement step falls within a range of a reference value.

2. The rotational torque inspection method for a bearing device for a vehicle wheel according to claim 1, wherein
in the post-press-fitting rotational torque measurement step, an outer-side seal member is fitted to an outer-side opening end of an annular space formed by the outer member and the inner member.

3. The rotational torque inspection method for a bearing device for a vehicle wheel according to claim 1, wherein
in the post-press-fitting rotational torque measurement step, the rotational torque is measured by relatively rotating the inner member and the outer member at a rotational speed between 10 rotations/min and 30 rotations/min.

4. The rotational torque inspection method for a bearing device for a vehicle wheel according to claim 1, wherein
in the post-press-fitting rotational torque measurement step, a measured value of the post-press-fitting rotational torque is corrected according to temperature of the bearing device for a vehicle wheel at which the post-press-fitting rotational torque is measured.

5. The rotational torque inspection method for a bearing device for a vehicle wheel according to claim 1, wherein
a space between the hub ring and the outer member is filled with grease, the rotational torque inspection method further comprising a lubrication step performed at least between the press-fitting step and the post-press-fitting rotational torque measurement step, the lubrication step being a step of relatively rotating the inner member and the outer member to lubricate the rolling body with the grease.

6. A rotational torque inspection method for a bearing device for a vehicle wheel including:
an outer member having a plurality of rows of outer raceway surfaces on an inner periphery;
an inner member including a hub ring having a small-diameter step portion extending in an axial direction on an outer periphery and an inner ring press-fitted into the small-diameter step portion of the hub ring, the inner member having a plurality of rows of inner raceway surfaces facing the plurality of rows of outer raceway surfaces; and
a plurality of rows of rolling bodies rollably accommodated between both raceway surfaces of the outer member and the inner member, the rotational torque inspection method comprising:

a crimping step of crimping an inner-side end portion of the small-diameter step portion into which the inner ring is press-fitted to the inner ring;

a post-crimping rotational torque measurement step of measuring post-crimping rotational torque of the bearing device for a vehicle wheel when the inner member and the outer member are relatively rotated after the crimping step; and a post-crimping rotational torque determination step of determining appropriateness or inappropriateness of the post-crimping rotational torque depending on whether or not the post-crimping rotational torque measured in the post-crimping rotational torque measurement step falls within a range of a reference value.

7. The rotational torque inspection method for a bearing device for a vehicle wheel according to claim 6, wherein
in the post-crimping rotational torque measurement step, an outer-side seal member is fitted to an outer-side opening end of an annular space formed by the outer member and the inner member.

8. The rotational torque inspection method for a bearing device for a vehicle wheel according to claim 6, wherein
in the post-crimping rotational torque measurement step, the rotational torque is measured by relatively rotating the inner member and the outer member at a rotational speed between 10 rotations/min and 30 rotations/min.

9. The rotational torque inspection method for a bearing device for a vehicle wheel according to claim 6, wherein
in the post-crimping rotational torque measurement step, a measured value of the post-crimping rotational torque is corrected according to temperature of the bearing device for a vehicle wheel at which the post-crimping rotational torque is measured.

10. The rotational torque inspection method for a bearing device for a vehicle wheel according to claim 6, wherein
a space between the hub ring and the outer member is filled with grease, the rotational torque inspection method further comprising a lubrication step performed at least between the crimping step and the post-crimping rotational torque measurement step, the lubrication step being a step of relatively rotating the inner member and the outer member to lubricate the rolling body with the grease.

11. A rotational torque inspection device for a bearing device for a vehicle wheel including:
an outer member having a plurality of rows of outer raceway surfaces on an inner periphery;
an inner member including a hub ring having a small-diameter step portion extending in an axial direction on an outer periphery and an inner ring press-fitted into the small-diameter step portion of the hub ring, the inner member having a plurality of rows of inner raceway surfaces facing the plurality of rows of outer raceway surfaces; and
a plurality of rows of rolling bodies rollably accommodated between both raceway surfaces of the outer member and the inner member, the rotational torque inspection device capable of performing:

a press-fitting step of press-fitting the inner ring into the small-diameter step portion of the hub ring to a position where the inner ring abuts on the hub ring in the axial direction;

a post-press-fitting rotational torque measurement step of measuring post-press-fitting rotational torque of the bearing device for a vehicle wheel when the inner member and the outer member are relatively rotated after the press-fitting step; and a post-press-fitting rotational torque determination step of determining appropriateness or inappropriateness of the post-press-fitting rotational torque depending on whether or not the post-press-fitting rotational torque measured in the post-press-fitting rotational torque measurement step falls within a range of a reference value.

12. A rotational torque inspection device for a bearing device for a vehicle wheel including:

an outer member having a plurality of rows of outer raceway surfaces on an inner periphery;

an inner member including a hub ring having a small-diameter step portion extending in an axial direction on an outer periphery and an inner ring press-fitted into the small-diameter step portion of the hub ring, the inner member having a plurality of rows of inner raceway surfaces facing the plurality of rows of outer raceway surfaces; and a plurality of rows of rolling bodies rollably accommodated between both raceway surfaces of the outer member and the inner member, the rotational torque inspection device capable of performing:

a crimping step of crimping an inner-side end portion of the small-diameter step portion into which the inner ring is press-fitted to the inner ring;

a post-crimping rotational torque measurement step of measuring post-crimping rotational torque of the bearing device for a vehicle wheel when the inner member and the outer member are relatively rotated after the crimping step; and a post-crimping rotational torque determination step of determining appropriateness or inappropriateness of the post-crimping rotational torque depending on whether or not the post-crimping rotational torque measured in the post-crimping rotational torque measurement step falls within a range of a reference value.

* * * * *